(12) United States Patent
Hoehne et al.

(10) Patent No.: US 11,065,843 B2
(45) Date of Patent: Jul. 20, 2021

(54) MULTI-LAYERED FINISHES FOR CAN ENDS

(71) Applicant: Novelis Inc., Atlanta, GA (US)

(72) Inventors: Joerg Hoehne, Goettingen (DE); Caecilia Schwager, Bovenden (DE); Ian Mussen Campbell, Goettingen (DE); Thomas Wuttke, Renshausen (DE); Manuela Wuttke, Renshausen (DE)

(73) Assignee: Novelis Inc., Atlanta, GA (US)

( * ) Notice: Subject to any disclaimer, the term of this patent is extended or adjusted under 35 U.S.C. 154(b) by 151 days.

(21) Appl. No.: 15/988,089

(22) Filed: May 24, 2018

(65) Prior Publication Data

US 2018/0353993 A1    Dec. 13, 2018

Related U.S. Application Data

(60) Provisional application No. 62/516,281, filed on Jun. 7, 2017.

(51) Int. Cl.
| | |
|---|---|
| *B05D 5/06* | (2006.01) |
| *B05D 7/00* | (2006.01) |
| *B32B 15/08* | (2006.01) |
| *B32B 15/20* | (2006.01) |
| *C09D 5/36* | (2006.01) |

(52) U.S. Cl.
CPC .............. *B32B 15/08* (2013.01); *B32B 15/20* (2013.01); *B05D 5/068* (2013.01); *B05D 2202/25* (2013.01); *B05D 2601/04* (2013.01); *C09D 5/36* (2013.01); *Y10T 428/251* (2015.01)

(58) Field of Classification Search
CPC . B05D 5/062; B05D 7/14; B05D 5/06; B05D 7/53; B05D 7/532; B05D 7/534; B05D 7/572; B05D 7/574; B05D 2601/04; B05D 2202/25; B05D 5/068; C09D 5/36
See application file for complete search history.

(56) References Cited

U.S. PATENT DOCUMENTS

| | | | |
|---|---|---|---|
| 5,231,135 A | 7/1993 | Machell et al. | |
| 5,520,956 A | 5/1996 | Kieser et al. | |
| 5,760,128 A | 6/1998 | Baltus et al. | |
| 6,366,397 B1 | 4/2002 | Genjima et al. | |
| 6,472,026 B1 | 10/2002 | Maag et al. | |
| 6,696,106 B1 * | 2/2004 | Schultz | B05D 3/0254 427/409 |
| 8,092,909 B2 | 1/2012 | Yong et al. | |
| 8,822,025 B2 | 9/2014 | Decker et al. | |
| 2003/0039820 A1 | 2/2003 | Hall et al. | |
| 2004/0191540 A1 | 9/2004 | Jakobi et al. | |
| 2005/0255330 A1 * | 11/2005 | Meyer | C08G 63/672 428/480 |
| 2008/0187708 A1 | 8/2008 | Decker et al. | |
| 2008/0241472 A1 | 10/2008 | Shiao et al. | |
| 2009/0087675 A1 * | 4/2009 | Tonomura | C09D 5/36 428/500 |
| 2009/0268278 A1 | 10/2009 | Suzuki et al. | |
| 2010/0095618 A1 | 4/2010 | Edison et al. | |
| 2010/0237299 A1 | 9/2010 | Yamanaka et al. | |
| 2012/0107584 A1 | 5/2012 | Eibon et al. | |
| 2012/0269965 A1 | 10/2012 | Doessel et al. | |
| 2013/0209717 A1 | 8/2013 | Edwards et al. | |

FOREIGN PATENT DOCUMENTS

| | | |
|---|---|---|
| CA | 2377924 | 1/2001 |
| CA | 2474837 | 8/2003 |
| CN | 101472738 | 7/2009 |
| DE | 4422287 | 1/1996 |
| EP | 0186607 | 7/1986 |
| EP | 0320552 A1 | 6/1989 |
| EP | 0322755 A1 | 7/1989 |
| EP | 0525867 | 2/1993 |
| EP | 0597326 | 5/1994 |
| EP | 2756042 B1 | 11/2016 |
| EP | 2598254 | 4/2017 |
| FR | 3011753 | 4/2015 |
| GB | 2477932 | 8/2011 |
| JP | S63190684 | 8/1988 |
| JP | H0413877 | 1/1992 |
| JP | H06210943 | 8/1994 |
| JP | H09267458 | 10/1997 |
| JP | 2001321676 | 11/2001 |
| JP | 2005066429 | 3/2005 |
| JP | 2005218978 | 8/2005 |
| JP | 2010517817 | 5/2010 |
| JP | 2010221100 | 10/2010 |
| JP | 2013224039 | 10/2013 |
| JP | 2014501638 | 1/2014 |
| RU | 2445331 | 3/2012 |
| WO | 2007145083 | 12/2007 |
| WO | 2017088988 | 6/2017 |

OTHER PUBLICATIONS

Basu et al. (Mechanism of wrinkle formation in curing coatings, Progress in Organic Coatings, vol. 53, Issue 1, 2005, pp. 1-16). (Year: 2005).*
PCT/US2018/034348, "International Search Report and Written Opinion", dated Nov. 7, 2018, 20 pages.
"Technical Bulletin #5 Solar Reflectivity Index (SRI)", OTS Manufacturing & Supply, Inc., 2010, 2 pages.
"White Paper-Reflective Roof Coatings and Leed v4", RCMA, Nov. 2015.
Lucas , "What Is Visible Light?", Live Science, Apr. 30, 2015.
PCT/US2018/034348 , "International Preliminary Report on Patentability", dated Dec. 19, 2019, 14 pages.

(Continued)

*Primary Examiner* — Cheng Yuan Huang
(74) *Attorney, Agent, or Firm* — Kilpatrick Townsend & Stockton LLP (57) ABSTRACT

Described herein are coating systems for preparing multi-layered finishes, multi-layered finish coated substrates, and methods of applying multi-layered finishes to substrates. A coating system for preparing multi-layered finishes includes a base coating component and a clear coating component comprising effects particles. An additional coating system for preparing multi-layered finishes includes a base coating component, a printed coating component, and a clear coating component.

12 Claims, 3 Drawing Sheets

(56) References Cited

OTHER PUBLICATIONS

"Hunter L, a, b Versus CIE 1976 L*a*b*", Application Notes, Insight on Color, vol. 13, No. 220, 2008, 4 pages.
BASF, "Paint It Cool! Solar Heat Management in Paints and Coatings", http://www.dispersions-pigments.basf.com/portal/basf/ien/dt.jsp?setCursor=1_559806, Copyright 2017.
BASF, "Cool down your paints—Xfast stir in pigments for solar heat management", URL: https://www.dispersions-pigments.basf.com/portal/streamer?fid=560473, 2008, promotional brochure.
BASF, "Paint it cool! Pigments for solar heat management in paints", url: http://www.dispersions-pigments.basf.com/portal/streamer?fid=560474, 2009, promotional brochure.
PPG Industries, Inc., "Building Products Coil Coatings Color Guide", 2014, promotional brochure.
Ruch, Thomas, et al., Keep it Cool! Neue Wege zur Verringerung der Wärmeaufnahme bei dunklen Lackoberflächen. Vortrag, GDCh-Lacktagung, Sep. 23, 2010.
PCT/US2018/034348, "Invitation to Pay Additional Fees and Partial Search Report", dated Sep. 10, 2018, 13 pages.
European Application No. 18733722.5, Office Action, dated Nov. 20, 2020, 7 pages.
"BASF Paliogen Black", Data Sheet, 2003.
"BASF Paliogen Black", IR curve, 2020.
Australian Application No. 2018279909, "First Examination Report", dated Sep. 16, 2020, 4 pages.
Indian Application No. 201917050444, "First Examination Report", dated Jun. 25, 2020, 5 pages.
Schaeffler, "Sheet Aluminum Alloys for Cans and Cars", Sep. 14, 2015, 6 pages.

\* cited by examiner

MULTI-LAYERED FINISHES FOR CAN ENDS

CROSS-REFERENCE TO RELATED APPLICATION

This application claims the benefit of U.S. Provisional Application No. 62/516,281, filed Jun. 7, 2017, which is incorporated herein by reference in its entirety.

FIELD

This disclosure relates to the fields of coatings, material science, material chemistry, metallurgy, aluminum alloys, and related fields. More specifically, the disclosure provides novel multi-layered finishes for metal substrates that can be used in can applications, among other applications.

BACKGROUND

Colored metal products can uniquely identify a source of a good to a consumer. For example, the color of an aluminum container can indicate a brand to a consumer. In addition, consumers may be attracted to a certain brand based on the aesthetic qualities of the container.

SUMMARY

Covered embodiments of the invention are defined by the claims, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

Described herein are multi-layered finish coated substrates, coating systems for preparing multi-layered finishes, and methods of applying multi-layered finishes to substrates. In some cases, the multi-layered finishes include effects particles in the outermost layer of the finish. A multi-layered finish coated substrate can include a substrate, a base coating layer adhered to the substrate, and a clear coating layer comprising effects particles. The clear coating layer can be adhered to the base coating layer. In some examples, the effects particles comprise pearlescent particles (e.g., flakes of mica). Optionally, the substrate comprises a metal substrate, such as an aluminum substrate. The aluminum substrate can optionally be a beverage can end. The base coating layer can comprise a pigment or a dye. Optionally, the base coating layer can comprise a printed pattern.

A coating system comprising a base coating component and a clear coating component comprising effects particles is also described herein. The concentration of the effects particles can be at least about 0.1% based on the weight of the clear coating component (e.g., from about 0.1% to about 20% based on the weight of the clear coating component).

Further described herein are multi-layered finish coated products and coating systems used to prepare the finishes, wherein the finishes display a print or pattern. In some examples, a multi-layered finish coated product comprises a substrate, a base coating layer, a printed coating layer, and a clear coating layer. The base coating layer is adhered to the substrate. The printed coating layer is adhered to the base coating layer and the clear coating layer. Optionally, the substrate comprises a metal substrate (e.g., an aluminum substrate). The aluminum substrate can be a beverage can end or another aluminum substrate. Optionally, the printed coating layer exhibits a wood-grain effect, a patina effect, or an animal print effect. The clear coating layer can comprise a wrinkled surface.

A coating system comprising a base coating component, a printed coating component, and a clear coating component is described herein. The printed coating component imparts a wood-grain effect, a patina effect, or an animal print effect to the finish resulting from the coating system.

Also described herein are multi-layered finish coated substrates, wherein the finishes display a wrinkled effect. In some examples, a multi-layered finish coated product comprises a substrate, a base coating layer adhered to the substrate, and a clear coating layer comprising a wrinkled surface. The clear coating layer is adhered to the base coating layer. Optionally, the substrate comprises a metal substrate (e.g., an aluminum substrate). The aluminum substrate can be a beverage can end or another aluminum substrate.

Methods of applying a multi-layered finish to a substrate surface are also described herein. A non-limiting method of applying a multi-layered finish to a substrate surface comprises applying a base coating component to the substrate surface, drying the base coating component to form a base coating layer, applying a clear coating component comprising effects particles to form a clear coating layer, and drying the clear coating component to form a clear coating layer. Optionally, the thickness of the base coating layer can be from about 0.1 µm to about 15 µm. Optionally, the thickness of the clear coating layer can be from about 1 µm to about 20 µm. The method can further comprise a step of applying and drying a third coating component to form a third coating layer. The applying and drying the third coating component step can be performed after the step of drying the base coating and before the step of applying the clear coating. Optionally, the third coating component comprises a printed coating component. Optionally, the finish can be applied to aluminum products. For example, the finish can be applied to a can end (e.g., a beverage can end) or other aluminum products.

Further described herein are methods of imparting a wrinkled surface to a substrate, comprising applying a base coating component to a substrate surface; drying the base coating component to form a base coating layer; applying a clear coating component; drying the clear coating component to form a clear coating layer; treating the clear coating layer with an amine-neutralized acid catalyst; and curing the clear coating layer to produce a wrinkled surface. In some cases, the amine-neutralized acid catalyst comprises an amine neutralized p-toluenesulfonic acid catalyst. Optionally, the thickness of the base coating layer can be from about 0.1 µm to about 15 µm. Optionally, the thickness of the clear coating layer can be from about 1 µm to about 20 µm. The methods of imparting a wrinkled surface to a substrate can further comprise applying and drying a third coating component (e.g., a printed coating component) to form a third coating layer. The step of applying and drying the third coating component can be performed after the step of drying the base coating and before the step of applying the clear coating.

Also described herein are multi-layered finish coated products comprising a substrate, a base coating layer adhered to the substrate, and a clear coating layer, wherein a coat weight of the clear coating layer is from about 4.0 g/m² to about 10.0 g/m² (e.g., from about 5.0 g/m² to about 8.0 g/m²). Optionally, the substrate comprises a metal substrate (e.g., an aluminum substrate). The aluminum substrate can be a beverage can end (e.g., a 200 can end, a 202 can end, a 206 can end, or a 209 can end) or a beverage can tab. Optionally, the base coating layer comprises a pigment or a dye. The multi-layered finish coated product can further comprise a third coating layer.

Methods of applying a multi-layered finish to a substrate surface are also described herein. The methods comprise applying a base coating component to the substrate surface, drying the base coating component to form a base coating layer, applying a clear coating component, and drying the clear coating component to form a clear coating layer, wherein a coat weight of the clear coating layer is from about 4.0 g/m² to about 10.0 g/m² (e.g., from about 5.0 g/m² to about 8.0 g/m²). The methods can further comprise applying and drying a third coating component to form a third coating layer. The step of applying and drying the third coating component can be performed after the step of drying the base coating component and before the step of applying the clear coating component.

Other objects, aspects, and advantages will become apparent upon consideration of the following detailed description of non-limiting examples and the drawings.

DETAILED DESCRIPTION

Provided herein are multi-layered finish coated substrates, coating systems for preparing multi-layered finishes, and methods of applying multi-layered finishes to substrates. Suitable substrates for coating with the finishes described herein include metal substrates (e.g., aluminum or steel substrates). As used herein, the substrate is considered to be coated when a finish component is in contact with at least a portion of a surface of the substrate. Optionally, the entirety of a surface of a substrate can be coated with a finish component as described herein. Optionally, more than one surface of a substrate can be coated with a finish component as described herein. Suitable substrates include substrates in the can industry (e.g., can end stock), among others.

Definitions and Descriptions

As used herein, the terms "invention," "the invention," "this invention" and "the present invention" are intended to refer broadly to all of the subject matter of this patent application and the claims below. Statements containing these terms should be understood not to limit the subject matter described herein or to limit the meaning or scope of the patent claims below.

In this description, reference is made to alloys identified by aluminum industry designations, such as "series" or "3xxx." For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

As used herein, the meaning of "a," "an," and "the" includes singular and plural references unless the context clearly dictates otherwise.

All ranges disclosed herein are to be understood to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g., 1 to 6.1, and ending with a maximum value of 10 or less, e.g., 5.5 to 10.

Coating Systems and Coated Substrates

Described herein are coating systems that can be used to prepare multi-layered finishes on a substrate. In some examples, the coating systems can include a printed coating in contact with a clear coating as the outermost layer, thereby producing printed-coating finishes. In some cases, the coating systems can include effects particles in the outermost layer and can therefore produce sparkling, shimmering, or pearlescent visual effects to the substrate to which the finishes are applied. The printed-coating finishes and sparkling, shimmering, or pearlescent finishes, along with substrates coated with such finishes, are further described below.

Coated Substrates

A multi-layered finish can be prepared from a coating system that includes a base coating and a clear coating. The base coating layer is prepared from a base coating component. The base coating component can include any component conventionally used in a base coating composition, including polymers such as acrylic polymers or polyesters. Optionally, the base coating component can include one or more crosslinking agents. The base coating component can also include a pigment or dye. For example, the base coating component can include metallic oxides (e.g., titanium dioxide, zinc oxide, and iron oxide), carbon black, organic pigments and dyes, metallic flake pigments, filler pigments, and silica. The base coating component can further include a carrier, such as an aqueous or a solvent-based carrier.

The clear coating layer can be adhered to the base coating layer, such that the clear coating layer is the outermost layer of the finish (i.e., the layer of the finish exposed to the environment). The clear coating layer is prepared from the clear coating component. The clear coating component can include polymers, such as, but not limited to, an epoxy or polyester resin. The clear coating component can further include a carrier, such as, but not limited to, an aqueous or a solvent-based carrier.

The coat weight for the clear coating layer can be from about 4.0 g/m² to about 10.0 g/m². For example, the coat weight for the clear coating layer can be about 4.0 g/m², about 4.5 g/m², about 5.0 g/m², about 5.5 g/m², about 6.0 g/m², about 6.5 g/m², about 7.0 g/m², about 7.5 g/m², about 8.0 g/m², about 8.5 g/m², about 9.0 g/m², about 9.5 g/m², or about 10.0 g/m². The coat weight used for the clear coating component can eliminate contact between the base coating layer or intervening layer (e.g., a third coating layer) and a substance stored within the aluminum product (e.g., a beverage or food). The coat weight used for the clear coating component can also protect the base coating layer or intervening layer from excessive abrasion and also protects the tooling used in making and forming the aluminum product into its end use form.

The finish can be applied to metal substrates and can be used to coat metal substrates, such as aluminum or steel substrates. In some cases, the aluminum substrate is a 3xxx series aluminum alloy or a 5xxx series aluminum alloy, although the aluminum substrate could be any suitable series aluminum alloy. Suitable 3xxx series aluminum alloys include, for example, AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, and AA3065.

Suitable 5xxx series aluminum alloys include, for example, AA5005, AA5005A, AA5205, AA5305, AA5505, AA5605, AA5006, AA5106, AA5010, AA5110, AA5110A, AA5210, AA5310, AA5016, AA5017, AA5018, AA5018A, AA5019, AA5019A, AA5119, AA5119A, AA5021, AA5022, AA5023, AA5024, AA5026, AA5027, AA5028, AA5040, AA5140, AA5041, AA5042, AA5043, AA5049, AA5149, AA5249, AA5349, AA5449, AA5449A, AA5050, AA5050A, AA5050C, AA5150, AA5051, AA5051A, AA5151, AA5251, AA5251A, AA5351, AA5451, AA5052, AA5252, AA5352, AA5154, AA5154A, AA5154B, AA5154C, AA5254, AA5354, AA5454, AA5554, AA5654, AA5654A, AA5754, AA5854, AA5954, AA5056, AA5356, AA5356A, AA5456, AA5456A, AA5456B, AA5556, AA5556A, AA5556B, AA5556C, AA5257, AA5457, AA5557, AA5657, AA5058, AA5059, AA5070, AA5180, AA5180A, AA5082, AA5182, AA5083, AA5183, AA5183A, AA5283, AA5283A, AA5283B, AA5383, AA5483, AA5086, AA5186, AA5087, AA5187, and AA5088.

In some examples, the finish can be applied to a can end (e.g., a beverage can end), a can tab, or other desired product. Can ends of all sizes are suitable for use as the substrate. For example, the can end can be a 200 can end, a 202 can end, a 206 can end, or a 209 can end.

The coating system can be applied to a substrate to form a multi-layered finish coated substrate. The multi-layered finish coated substrate includes a substrate, a base coating layer, and a clear coating layer. The base coating layer is adhered to the substrate. Optionally, the multi-layered finish coated substrate includes a third coating layer. In some cases, the multi-layered finish coated substrate includes a substrate, a base coating layer having a first surface and a second surface, a clear coating layer having a first surface and a second surface, and a third coating layer having a first surface and a second surface. Optionally, the first surface of the base coating layer can be adhered to the substrate and the second surface of the base coating layer can be adhered to the first surface of the third coating layer. The second surface of the third coating layer can be adhered to the first surface of the clear coating layer. Optionally, the first surface of the base coating layer can be adhered to the substrate and the second surface of the base coating layer can be adhered to the first surface of the clear coating layer. The second surface of the clear coating layer can be adhered to the first surface of the third coating layer.

Pearlescent Finishes and Coated Substrates

A sparkling, shimmering, or pearlescent finish can be prepared from a coating system that includes a base coating and a clear coating. The clear coating can include effects particles. Optionally, the base coating can include effects particles. Optionally, the effects particles include pearlescent particles, such as flakes of mica.

The concentration of the effects particles is at least about 0.1% based on the weight of the clear coating component (e.g., from about 0.1 wt. % to about 20 wt. % or from about 0.5 wt. % to about 10 wt. %). For example, the concentration of the effects particles can be about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, about 12.5 wt. %, about 13.0 wt. %, about 13.5 wt. %, about 14.0 wt. %, about 14.5 wt. %, about 15.0 wt. %, about 15.5 wt. %, about 16.0 wt. %, about 16.5 wt. %, about 17.0 wt. %, about 17.5 wt. %, about 18.0 wt. %, about 18.5 wt. %, about 19.0 wt. %, about 19.5 wt. %, or about 20.0 wt. % based on the weight of the clear coating component. Optionally, the concentration of the effects particles can be from about 0.5% to about 3.0% based on the weight of the clear coating component.

The coating system can be applied to a substrate to form a multi-layered finish coated substrate. The multi-layered finish coated substrate includes a substrate, a base coating layer, and a clear coating layer.

The base coating layer is prepared from a base coating component. The base coating component can include any component conventionally used in a base coating composition, including polymers such as acrylic polymers or polyesters. Optionally, the base coating component can include one or more crosslinking agents. The base coating component can also include a pigment or dye. For example, the base coating component can include metallic oxides (e.g., titanium dioxide, zinc oxide, and iron oxide), carbon black, organic pigments and dyes, metallic flake pigments, filler pigments, and silica. Optionally, the base coating component can include a printed pattern. The base coating component can further include a carrier, such as an aqueous or a solvent-based carrier.

The clear coating layer can be adhered to the base coating layer, such that the clear coating layer is the outermost layer of the finish (i.e., the layer of the finish exposed to the environment). The clear coating layer is prepared from the clear coating component and includes effects particles. The clear coating component can also include polymers, such as, but not limited to, an epoxy or polyester resin. The clear coating component can further include a carrier, such as, but not limited to, an aqueous or a solvent-based carrier.

Not intending to be bound by theory, the effects particles do not reflect light, but rather can allow light pass through them, which is then refracted evenly throughout the substrate's surface. Unlike metallic particles, the effects particles described herein can act like very small prisms that refract white light into different shades. The effect of a pearlescent finish is color flipping based on the perspective of an observer.

The amount of effects particles in the clear coating layer can be adjusted to achieve the desired effect in the product. For example, the finish can appear to sparkle at one angle of observation and can appear to not sparkle at another angle of observation. The concentration of the effects particles in the dried clear coating layer is at least about 0.1 wt. % (e.g., from about 0.1 wt. % to about 20 wt. %, from about 0.5 wt. % to about 10 wt. %, or from about 1 wt. % to about 5 wt. %). For example, the concentration of the effects particles based on the weight of the dried clear coating layer can be about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1.0 wt. %, about 1.5 wt. %, about 2.0 wt. %, about 2.5 wt. %, about 3.0 wt. %, about 3.5 wt. %, about 4.0 wt. %, about 4.5 wt. %, about 5.0 wt. %, about 5.5 wt. %, about 6.0 wt. %, about 6.5 wt. %, about 7.0 wt. %, about 7.5 wt. %, about 8.0 wt. %, about 8.5 wt. %, about 9.0 wt. %, about 9.5 wt. %, about 10.0 wt. %, about 10.5 wt. %, about 11.0 wt. %, about 11.5 wt. %, about 12.0 wt. %, about 12.5 wt. %, about 13.0 wt. %, about 13.5 wt. %, about 14.0 wt. %, about 14.5 wt. %, about 15.0 wt. %, about 15.5 wt. %, about 16.0 wt. %, about 16.5 wt. %, about 17.0 wt. %, about 17.5 wt. %, about 18.0 wt. %, about 18.5 wt. %, about 19.0 wt. %, about 19.5 wt. %, or about 20.0 wt. %.

The finish can be applied to metal substrates and can be used to coat metal substrates, such as aluminum or steel substrates. In some cases, the aluminum substrate is a 3xxx series aluminum alloy, although it could be any suitable series aluminum alloy. Suitable 3xxx series aluminum alloys include, for example, AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, and AA3065.

Figure 1:
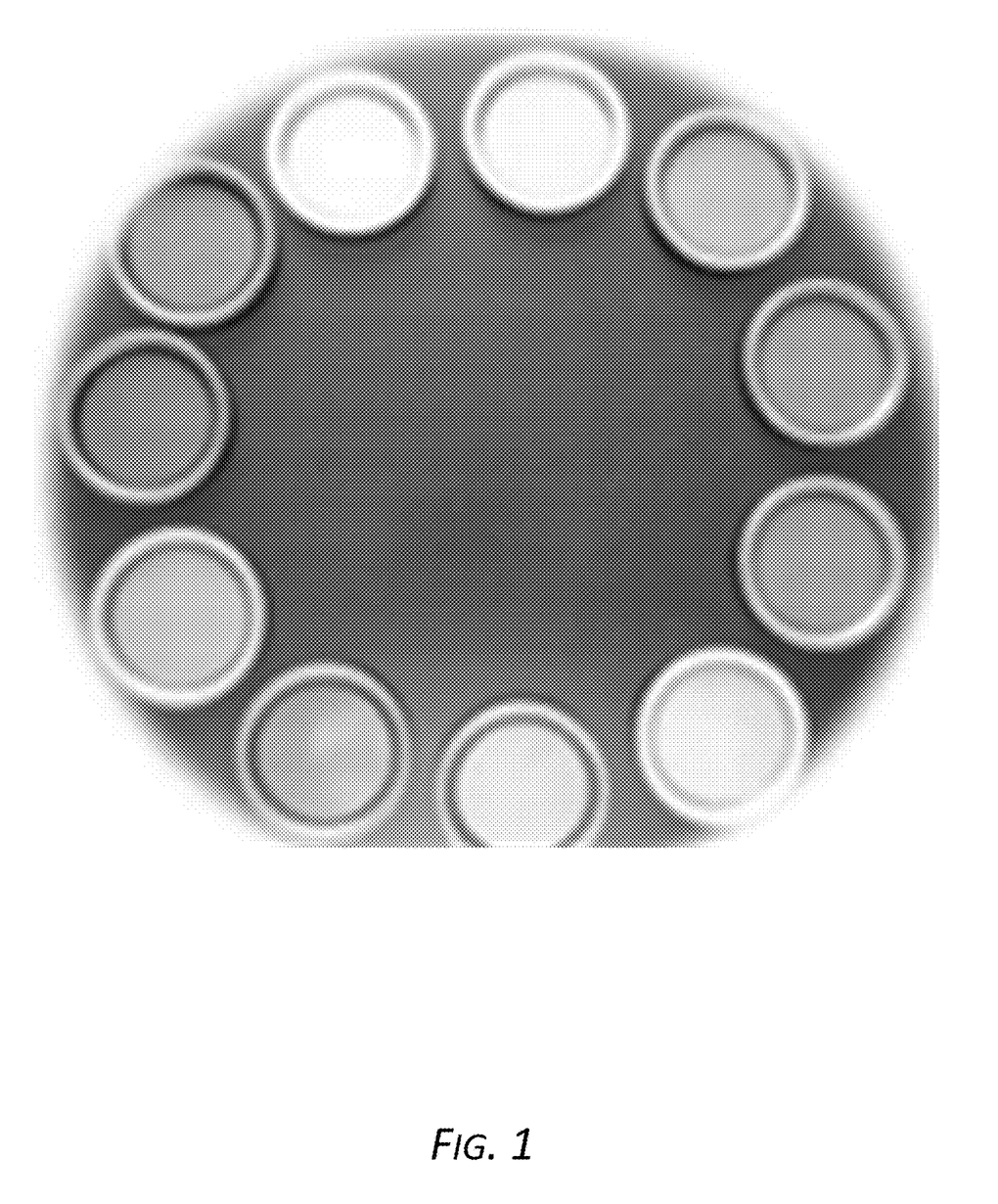
FIG. 1 shows pictures of effect pigments on an aluminum beverage can end product.

In some examples, the finish can be applied to a can end (e.g., a beverage can end) or other desired product. For example, the finish can be applied to an aluminum beverage can end as shown in FIG. 1. The can end can be a singular color or can flip colors based on the observer's perspective. Can ends of all sizes are suitable for use as the substrate. For example, the can end can be a 200can end, a 202 can end, a 206 can end, or a 209 can end.

Printed Coating Finishes and Coated Substrates

Figure 2:
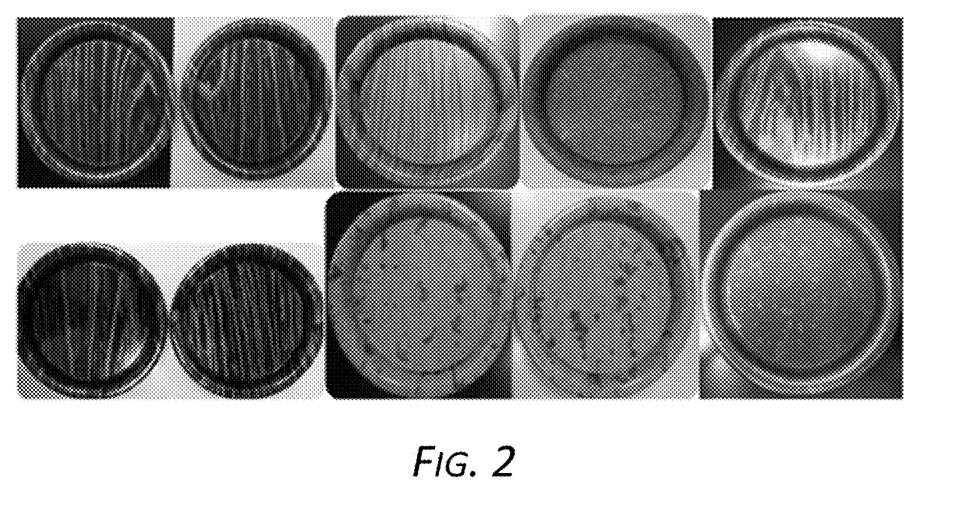
FIG. 2 shows pictures of can ends having a printed coated layer.

A printed finish can be prepared from a coating system that includes a base coating component as described above, a printed coating component, and a clear coating component. In some cases, the printed coating component can comprise a wood-grain effect, a patina speckled effect, or an animal print effect. As shown in FIG. 2, the printed coating component can be colored and can mimic prints that occur naturally. For example, the printed coating component can include a wood-grain print coating. In some cases, the wood-grain print coating can mimic a true wood product and be tan in color. In other examples, the wood-grain print coating can be outside of a natural print, such as a royal blue wood-grain.

In some examples, the printed coating component can be the layer in contact with the substrate. In other examples, the printed coating component can be sandwiched between the base coating component and the clear coating component. The clear coating component can optionally include effects particles. For example, the printed coating component can be applied to a colored base layer as part of a multi-layered finish, which is then covered with a clear coating component including effects particles.

The coating system can be applied to a substrate to form a multi-layered finish coated substrate. The multi-layered finish coated substrate includes a substrate, a base coating layer, a printed coating layer, and a clear coating layer. The base coating layer is adhered to the substrate. The printed coating layer is adhered to the base coating layer and the clear coating layer. In some cases, the multi-layered finish coated substrate includes a substrate, a base coating layer having a first surface and a second surface, a printed coating layer having a first surface and a second surface, and a clear coating layer. In these examples, the first surface of the base coating layer is adhered to the substrate and the second surface of the base coating layer is adhered to the first surface of the printed coating layer. The second surface of the printed coating layer is adhered to the clear coating layer.

In some examples, the finish can be applied to a metal substrate and can be used to coat a metal substrate. The metal substrate can be an aluminum or steel substrate. In some cases, the aluminum substrate is a 3xxx series aluminum alloy, although it could be any suitable series aluminum alloy. Suitable 3xxx series aluminum alloys include, for example, AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, and AA3065.

In some examples, the finish can be applied to a can end (e.g., a beverage can end). Can ends of all sizes are suitable for use as the substrate. For example, the can end can be a 200 can end, a 202 can end, a 206 can end, or a 209 can end. In other examples, the finish is applied to other products.

Method of Applying Coating Finishes

Also described herein is a method for applying a finish to an aluminum product. In some examples, the method comprises applying a base coating component to the surface of a substrate. The base coating component can be applied using any technique, including dipping and/or spraying. The base coating component can be dried to form a base coating layer. The base coating layer has a thickness ranging from about 0.1 µm to about 15 µm (e.g., from about 0.5 µm to about 15 µm or from about 1 µm to about 10 µm). In some examples, the base coating layer can have a thickness of about 0.1 µm, about 0.2 µm, about 0.3 µm, about 0.4 µm, about 0.5 µm, about 0.6 µm, about 0.7 µm, about 0.8 µm, about 0.9 µm, about 1 µm, about 2 µm, about 3 µm, about 4 µm, about 5 µm, about 6 µm, about 7 µm, about 8 µm, about 9 µm, about 10 µm, about 11 µm, about 12 µm, about 13 µm, about 14 µm, or about 15 µm.

A clear coating component can then be applied to the base coating component or to an intervening layer. The clear coating component can include effects particles in a heterogeneous or homogeneous mixture. Optionally, the clear coating component does not include effects particles. The clear coating component can then be dried to form a clear coating layer.

In some cases, the clear coating component can be applied to form a clear coating layer at a coat weight of from about 4.0 g/m$^2$ to about 10.0 g/m$^2$. For example, the clear coating component can be applied to form a clear coating layer at a coat weight of about 4.0 g/m$^2$, about 4.5 g/m$^2$, about 5.0 g/m$^2$, about 5.5 g/m$^2$, about 6.0 g/m$^2$, about 6.5 g/m$^2$, about 7.0 g/m$^2$, about 7.5 g/m$^2$, about 8.0 g/m$^2$, about 8.5 g/m$^2$, about 9.0 g/m$^2$, about 9.5 g/m$^2$, or about 10.0 g/m$^2$.

In some cases, the clear coating layer can have a thickness ranging from about 1 µm to about 20 µm (e.g., from about 5 µm to about 15 µm or from about 7 µm to about 12 µm). In some examples, the clear coating layer can have a thickness of about 1 µm, about 2 µm, about 3 µm, about 4

μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, or about 20 μm.

In some examples, the method can include applying a third coating component and drying the third coating component to form a third coating layer. The applying the third coating component and drying the third coating component steps are performed after the step of drying the base coating and before the step of applying the clear coating. In some cases, the third coating component includes a printed coating component, which can be dried to form a printed coating layer. The printed coating layer can have a thickness ranging from about 0.1 μm to about 20 μm (e.g., from about 0.5 μm to about 15 μm or from about 1 μm to about 10 μm). In some examples, the printed coating layer can have a thickness of about 0.1 μm, about 0.2 μm, about 0.3 μm, about 0.4 μm, about 0.5 μm, about 0.6 μm, about 0.7 μm, about 0.8 μm, about 0.9 μm, about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, or about 20 μm.

Wrinkled Surface Substrates and Methods of Preparing

Also described herein are multi-layered finish coated products that display a wrinkled effect. The multi-layered finish coated products include a substrate, a base coating layer, a clear coating layer that includes the wrinkled surface, and optionally one or more additional coating layers sandwiched between the base coating layer and the clear coating layer. The base coating layer is adhered to the substrate. The clear coating layer can either be adhered to the base coating layer or to an intervening additional coating layer, such as a printed coating layer as described herein.

In some examples, the finish can be applied to a metal substrate and can be used to coat a metal substrate. The metal substrate can be an aluminum or steel substrate. In some cases, the aluminum substrate is a 3xxx series aluminum alloy, although it could be any suitable series aluminum alloy. Suitable 3xxx series aluminum alloys include, for example, AA3002, AA3102, AA3003, AA3103, AA3103A, AA3103B, AA3203, AA3403, AA3004, AA3004A, AA3104, AA3204, AA3304, AA3005, AA3005A, AA3105, AA3105A, AA3105B, AA3007, AA3107, AA3207, AA3207A, AA3307, AA3009, AA3010, AA3110, AA3011, AA3012, AA3012A, AA3013, AA3014, AA3015, AA3016, AA3017, AA3019, AA3020, AA3021, AA3025, AA3026, AA3030, AA3130, and AA3065.

In some examples, the finish can be applied to a can end (e.g., a beverage can end). Can ends of all sizes are suitable for use as the substrate. For example, the can end can be a 200 can end, a 202 can end, a 206 can end, or a 209 can end. In other examples, the finish is applied to other products.

The wrinkled surface can be imparted to the clear coating layer through the reaction and curing of the finish components. The wrinkled surface can be imparted by forming a layered finish on a substrate. In some cases, the layered finish can be formed by applying a base coating component to a substrate surface, drying the base coating component to form a base coating layer, applying a clear coating component, and drying the clear coating component to form a clear coating layer, as described above. The base coating layer and the clear coating layer can have a thickness as described above. Specifically, the base coating layer can have a thickness ranging from about 0.1 μm to about 15 μm (e.g., from about 0.5 μm to about 15 μm or from about 1 μm to about 10 μm). In some examples, the base coating layer can have a thickness of about 0.1 μm, about 0.2 μm, about 0.3 μm, about 0.4 μm, about 0.5 μm, about 0.6 μm, about 0.7 μm, about 0.8 μm, about 0.9 μm, about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, or about 15 μm.

In some cases, the clear coating layer can have a thickness ranging from about 1 μm to about 20 μm (e.g., from about 5 μm to about 15 μm or from about 7 μm to about 12 μm). In some examples, the clear coating layer can have a thickness of about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, or about 20 μm.

Optionally, a third coating component (e.g., a printed coating component) can be applied and dried to form a third coating layer. The third coating layer can be applied and dried after the step of drying the base coating and before the step of applying the clear coating, resulting in a structure in which a printed coating component, for example, is sandwiched between the base coating layer and the clear coating layer. The third coating layer can have a thickness ranging from about 0.1 μm to about 20 μm (e.g., from about 0.5 μm to about 15 μm or from about 1 μm to about 10 μm). In some examples, the third coating layer can have a thickness of about 0.1 μm, about 0.2 μm, about 0.3 μm, about 0.4 μm, about 0.5 μm, about 0.6 μm, about 0.7 μm, about 0.8 μm, about 0.9 μm, about 1 μm, about 2 μm, about 3 μm, about 4 μm, about 5 μm, about 6 μm, about 7 μm, about 8 μm, about 9 μm, about 10 μm, about 11 μm, about 12 μm, about 13 μm, about 14 μm, about 15 μm, about 16 μm, about 17 μm, about 18 μm, about 19 μm, or about 20 μm.

The clear coating layer can then be contacted with an amine-neutralized acid catalyst. Suitable amine-neutralized acid catalysts include, but are not limited to, amine-neutralized sulfonic acid catalysts, such as an amine neutralized p-toluenesulfonic acid catalyst. In some examples, the amount of amine-neutralized acid catalyst used for contacting with the clear coating layer can range from about 0.1 wt. % to about 10 wt. % (e.g., from about 0.5 wt. % to about 5 wt. % or from about 1 wt. % to about 3 wt. %). For example, the amount of amine-neutralized acid catalyst can be about 0.1 wt. %, about 0.2 wt. %, about 0.3 wt. %, about 0.4 wt. %, about 0.5 wt. %, about 0.6 wt. %, about 0.7 wt. %, about 0.8 wt. %, about 0.9 wt. %, about 1 wt. %, about 2 wt. %, about 3 wt. %, about 4 wt. %, about 5 wt. %, about 6 wt. %, about 7 wt. %, about 8 wt. %, about 9 wt. %, or about 10 wt. %. The clear coating layer can then be cured at an elevated temperature for a period of time to produce a wrinkled surface. Optionally, the elevated temperature can range from about 180° C. to about 270° C. (e.g., from about 190° C. to about 260° C. or from about 200° C. to about 250° C.). For example, the elevated temperature can be about 180° C., about 190° C., about 200° C., about 210° C., about 220° C., about 230° C., about 240° C., about 250° C., about 260° C., or about 270° C. The curing time can be from about 5 seconds to about 100 seconds (e.g., about 5 seconds, about 10 seconds, about 20 seconds, about 30 seconds, about 40 seconds, about 50 seconds, about 60 seconds, about 70 seconds, about 80 seconds, about 90 seconds, or about 100 seconds).

The following illustrations and examples will serve to further illustrate the present invention without, at the same time, however, constituting any limitation thereof. On the contrary, it is to be clearly understood that resort can be had to various embodiments, modifications, and equivalents thereof which, after reading the description herein, can suggest themselves to those skilled in the art without departing from the spirit of the invention. During the studies described in the following examples, conventional procedures were followed, unless otherwise stated. Some of the procedures are described below for illustrative purposes.

ILLUSTRATIONS

Illustration 1 is a multi-layered finish coated product, comprising a substrate, a base coating layer adhered to the substrate, and a clear coating layer comprising effects particles, wherein the clear coating layer is adhered to the base coating layer.

Illustration 2 is the multi-layered finish coated product of any preceding or subsequent illustration, wherein the effects particles comprise pearlescent particles.

Illustration 3 is the multi-layered finish coated product of any preceding or subsequent illustration, wherein the pearlescent particles comprise flakes of mica.

Illustration 4 is the multi-layered finish coated product of any preceding or subsequent illustration, wherein the substrate comprises a metal substrate.

Illustration 5 is the multi-layered finish coated product of any preceding or subsequent illustration, wherein the metal substrate comprises an aluminum substrate.

Illustration 6 is the multi-layered finish coated product of any preceding or subsequent illustration, wherein the aluminum substrate comprises a beverage can end.

Illustration 7 is the multi-layered finish coated product of any preceding or subsequent illustration, wherein the beverage can end is a 200 can end, a 202 can end, a 206 can end, or a 209 can end.

Illustration 8 is the multi-layered finish coated product of any preceding or subsequent illustration, wherein the base coating layer comprises a pigment or a dye.

Illustration 9 is the multi-layered finish coated product of any preceding or subsequent illustration, wherein the base coating layer comprises a printed pattern.

Illustration 10 is a coating system, comprising a base coating component and a clear coating component comprising effects particles.

Illustration 11 is the coating system of any preceding or subsequent illustration, wherein a concentration of the effects particles is at least about 0.1% by weight of the clear coating component.

Illustration 12 is the coating system of any preceding or subsequent illustration, wherein a concentration of the effects particles is from about 0.1% to about 20% by weight of the clear coating component.

Illustration 13 is a multi-layered finish coated product, comprising a substrate, a base coating layer adhered to the substrate, a printed coating layer, and a clear coating layer, wherein the printed coating layer is adhered to the base coating layer and the clear coating layer.

Illustration 14 is the multi-layered finish coated product of any preceding or subsequent illustration, wherein the substrate comprises a metal substrate.

Illustration 15 is the multi-layered finish coated product of any preceding or subsequent illustration, wherein the metal substrate comprises an aluminum substrate.

Illustration 16 is the multi-layered finish coated product of any preceding or subsequent illustration, wherein the aluminum substrate comprises a beverage can end.

Illustration 17 is the multi-layered finish coated product of any preceding or subsequent illustration, wherein the printed coating layer comprises a wood-grain effect, a patina effect, or an animal print effect.

Illustration 18 is the multi-layered finish coated product of any preceding or subsequent illustration, wherein the clear coating layer comprises a wrinkled surface.

Illustration 19 is a coating system, comprising a base coating component, a printed coating component, and a clear coating component.

Illustration 20 is the coating system of any preceding or subsequent illustration, wherein the printed coating component imparts a wood-grain effect, a patina effect, or an animal print effect.

Illustration 21 is a multi-layered finish coated product, comprising a substrate, a base coating layer adhered to the substrate, and a clear coating layer comprising a wrinkled surface.

Illustration 22 is the multi-layered finish coated product of any preceding or subsequent illustration, wherein the clear coating layer is adhered to the base coating layer.

Illustration 23 is the multi-layered finish coated product of any preceding or subsequent illustration, wherein the substrate comprises a metal substrate.

Illustration 24 is the multi-layered finish coated product of any preceding or subsequent illustration, wherein the metal substrate comprises an aluminum substrate.

Illustration 25 is the multi-layered finish coated product of any preceding or subsequent illustration, wherein the aluminum substrate comprises a beverage can end.

Illustration 26 is a method of applying a multi-layered finish to a substrate surface, comprising applying a base coating component to the substrate surface, drying the base coating component to form a base coating layer, applying a clear coating component, and drying the clear coating component to form a clear coating layer.

Illustration 27 is the method of applying a multi-layered finish to a substrate surface of any preceding or subsequent illustration, wherein the clear coating component comprises effects particles.

Illustration 28 is the method of applying a multi-layered finish to a substrate surface of any preceding or subsequent illustration, wherein a thickness of the base coating layer is from about 0.1 μm to about 15 μm.

Illustration 29 is the method of applying a multi-layered finish to a substrate surface of any preceding or subsequent illustration, wherein a thickness of the clear coating layer is from about 1 μm to about 20 μm.

Illustration 30 is the method of applying a multi-layered finish to a substrate surface of any preceding or subsequent illustration, further comprising applying and drying a third coating component to form a third coating layer.

Illustration 31 is the method of applying a multi-layered finish to a substrate surface of any preceding or subsequent illustration, wherein the step of applying and drying the third coating component is performed after the step of drying the base coating component and before the step of applying the clear coating component.

Illustration 32 is the method of applying a multi-layered finish to a substrate surface of any preceding or subsequent illustration, wherein the third coating component comprises a printed coating component.

Illustration 33 is a method of imparting a wrinkled surface to a substrate, comprising applying a base coating component to a substrate surface, drying the base coating component to form a base coating layer, applying a clear coating component, drying the clear coating component to form a clear coating layer, treating the clear coating layer with an amine-neutralized acid catalyst, and curing the clear coating layer to produce a wrinkled surface.

Illustration 34 is the method of imparting a wrinkled surface to a substrate of any preceding or subsequent illustration, wherein the amine-neutralized acid catalyst comprises an amine neutralized p-toluenesulfonic acid catalyst.

Illustration 35 is the method of imparting a wrinkled surface to a substrate of any preceding or subsequent illustration, wherein a thickness of the base coating layer is from about 0.1 μm to about 15 μm.

Illustration 36 is the method of imparting a wrinkled surface to a substrate of any preceding or subsequent illustration, wherein a thickness of the clear coating layer is from about 1 μm to about 20 μm.

Illustration 37 is the method of imparting a wrinkled surface to a substrate of any preceding or subsequent illustration, further comprising applying and drying a third coating component to form a third coating layer.

Illustration 38 is the method of imparting a wrinkled surface to a substrate of any preceding or subsequent illustration, wherein the step of applying and drying the third coating component is performed after the step of drying the base coating component and before the step of applying the clear coating component.

Illustration 39 is the method of imparting a wrinkled surface to a substrate of any preceding or subsequent illustration, wherein the third coating component comprises a printed coating component.

Illustration 40 is a multi-layered finish coated product, comprising a substrate, a base coating layer adhered to the substrate, and a clear coating layer, wherein a coat weight of the clear coating layer is from about 4.0 g/m² to about 10.0 g/m².

Illustration 41 is the multi-layered finish coated product of any preceding or subsequent illustration, wherein the coat weight is from about 5.0 g/m² to about 8.0 g/m².

Illustration 42 is the multi-layered finish coated product of any preceding or subsequent illustration, wherein the substrate comprises a metal substrate.

Illustration 43 is the multi-layered finish coated product of any preceding or subsequent illustration, wherein the metal substrate comprises an aluminum substrate.

Illustration 44 is the multi-layered finish coated product of any preceding or subsequent illustration, wherein the aluminum substrate comprises a beverage can end or a beverage can tab.

Illustration 45 is the multi-layered finish coated product of any preceding or subsequent illustration, wherein the beverage can end is a 200 can end, a 202 can end, a 206 can end, or a 209 can end.

Illustration 46 is the multi-layered finish coated product of any preceding or subsequent illustration, wherein the base coating layer comprises a pigment or a dye.

Illustration 47 is the multi-layered finish coated product of any preceding or subsequent illustration, further comprising a third coating layer.

Illustration 48 is a method of applying a multi-layered finish to a substrate surface, comprising applying a base coating component to the substrate surface, drying the base coating component to form a base coating layer, applying a clear coating component, and drying the clear coating component to form a clear coating layer, wherein a coat weight of the clear coating layer is from about 4.0 g/m² to about 10.0 g/m².

Illustration 49 is the method of applying a multi-layered finish to a substrate surface of any preceding or subsequent illustration, wherein a coat weight of the clear coating layer is from about 5.0 g/m² to about 8.0 g/m².

Illustration 50 is the method of applying a multi-layered finish to a substrate surface of any preceding or subsequent illustration, further comprising applying and drying a third coating component to form a third coating layer.

Illustration 51 is the method of applying a multi-layered finish to a substrate surface of any preceding or subsequent illustration, wherein the step of applying and drying the third coating component is performed after the step of drying the base coating component and before the step of applying the clear coating component.

EXAMPLES

Example 1: Exemplary Pigments

Exemplary tested effects pigments are listed in the table below. The effect pigments were tested in an epoxy solvent based clear coat.

| Number | Name | Color |
| --- | --- | --- |
| 1 | Iriodin 103 | Silver |
| 2 | Iriodin 111 | Satin |
| 3 | Iriodin 221 | Blue |
| 4 | Iriodin 219 | Lilac |
| 5 | Iriodin 7215 | Red |
| 6 | Iriodin 249 | Gold |
| 7 | Iriodin 299 | Green |
| 8 | Iriodin 153 | Pearl |
| 9 | Iriodin 4504 | Lava red |
| 10 | Iriodin 303 | Gold |
| 11 | Iriodin 506 | Orange |
| 12 | Iriodin 500 | Bronze |
| 13 | Iriodin 355 | Gold |
| 14 | Iriodin 323 | Gold |

Example 2: Wrinkled Effect Products

A wrinkled effect was imparted to finished substrates by treating the finished substrates with a p-toluenesulfonic acid (p-TSA) catalyst blocked with an amine. The substrates were then cured at approximately 249° C. for 12 seconds to provide the wrinkled surface.

Figure 3:
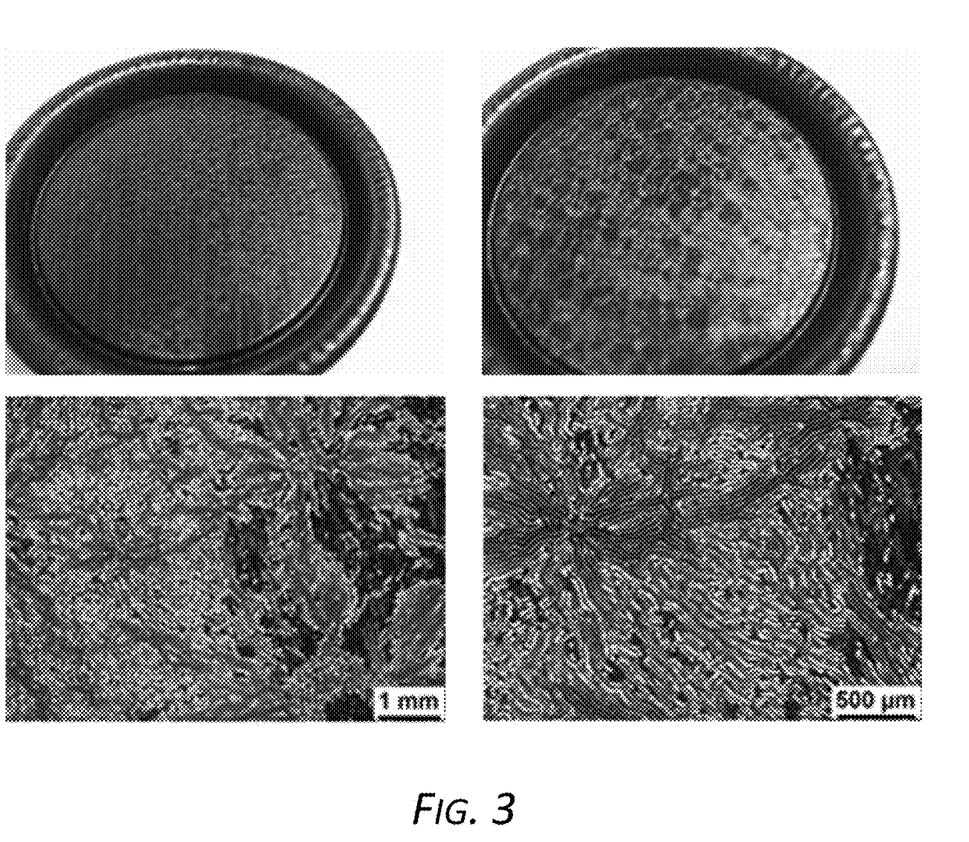
FIG. 3 shows pictures (upper images) and micrographs (lower images) of can ends having a printed coated layer and a wrinkled surface.

As shown in FIG. 3, a three-layer design produced an effect that simulates a wood-grain effect. For the three-layer system, a base coat was applied and dried and then a transparent printed coating component was applied and dried. After the printed coating component was dried to form a printed coating layer, a clear coating component was applied to the printed coating layer. The p-TSA catalyst blocked with an amine (3 wt. %) was then applied, and the substrates were cured as described above to form a substrate having a wrinkled effect. The substrate was then pressed to form a can end.

Figure 4:
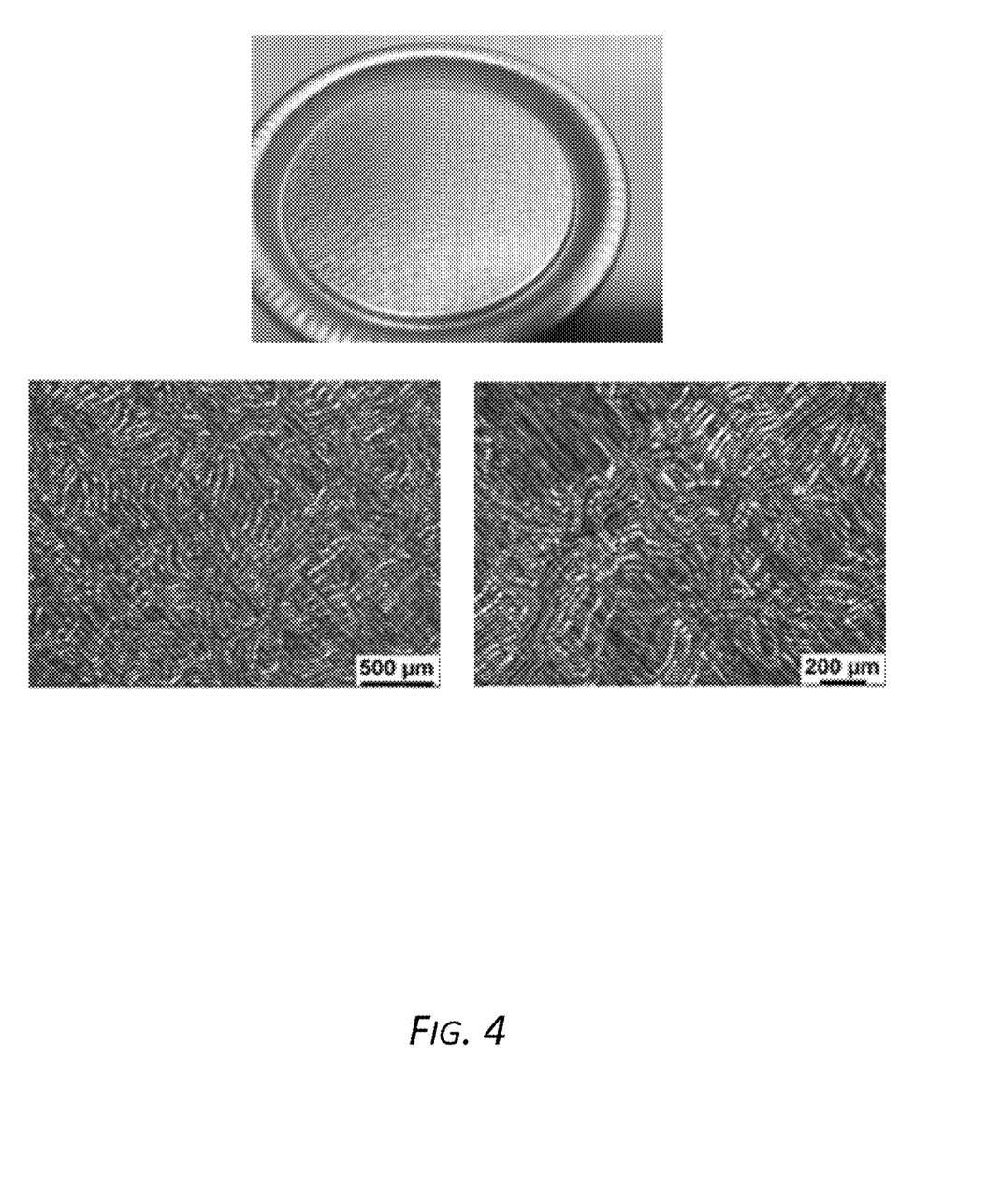
FIG. 4 shows a picture (upper image) and micrographs (lower images) of a can end with a wrinkled surface.

As shown in FIG. 4, a two-layer design produced a wrinkled effect. For the two-layer system, a base coat was applied and dried and then a clear coating component was applied. A p-TSA catalyst blocked with an amine was then applied, and the substrate was cured as described above to form a substrate having a wrinkled effect. The substrate was then pressed to form a can end.

All patents, publications, and abstracts cited above are incorporated herein by reference in their entireties. Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the present invention as defined in the following claims.

What is claimed is:

1. A multi-layered finish coated product, comprising:
   an aluminum substrate comprising a 3xxx series aluminum alloy or a 5xxx series aluminum alloy, wherein the aluminum substrate comprises a beverage can end;
   a base coating layer adhered to the aluminum substrate, wherein the base coating layer has a thickness of 0.1 µm to 15 µm; and
   a clear coating layer comprising effects particles, wherein the clear coating layer is adhered to the base coating layer, and wherein the clear coating layer has a thickness of 1 µm to 20 µm.

2. The multi-layered finish coated product of claim 1, wherein the effects particles comprise pearlescent particles.

3. The multi-layered finish coated product of claim 2, wherein the pearlescent particles comprise flakes of mica.

4. The multi-layered finish coated product of claim 1, wherein the beverage can end is a 200 can end, a 202 can end, a 206 can end, or a 209 can end.

5. The multi-layered finish coated product of claim 1, wherein the base coating layer comprises a pigment or a dye.

6. The multi-layered finish coated product of claim 1, wherein the base coating layer comprises a printed pattern.

7. The multi-layered finish coated product of claim 1, wherein a concentration of the effects particles is from 0.1% to 20% by weight of a clear coating component of the clear coating layer.

8. The multi-layered finish coated product of claim 7, wherein the concentration of the effects particles is from 0.5% to 10% by weight of the clear coating component of the clear coating layer.

9. The multi-layered finish coated product of claim 1, wherein a coat weight of the clear coating layer is from 4.0 g/m² to 10.0 g/m².

10. The multi-layered finish coated product of claim 1, wherein a coat weight of the clear coating layer is from 5.0 g/m² to 8.0 g/m².

11. The multi-layered finish coated product of claim 1, wherein the clear coating layer comprises a wrinkled surface.

12. A multi-layered finish coated product, consisting essentially of:
    an aluminum substrate comprising a 3xxx series aluminum alloy or a 5xxx series aluminum alloy, wherein the aluminum substrate comprises a beverage can end;
    a base coating layer adhered to the aluminum substrate, wherein the base coating layer has a thickness of 0.1 µm to 15 µm; and
    a clear coating layer comprising effects particles, wherein the clear coating layer is adhered to the base coating layer, and wherein the clear coating layer has a thickness of 1 µm to 20 µm.

* * * * *